United States Patent
Hybarger

[11] 3,918,321
[45] Nov. 11, 1975

[54] PARKING BRAKE CONTROL ASSEMBLY

[75] Inventor: Kenneth Charles Hybarger, Jackson, Mich.

[73] Assignee: International Telephone and Telegraph Corporation, New York, N.Y.

[22] Filed: Oct. 16, 1974

[21] Appl. No.: 515,086

[52] U.S. Cl. ............................ 74/516; 74/518
[51] Int. Cl.² .................................. G05G 7/04
[58] Field of Search ............... 74/518, 517, 516

[56] References Cited
UNITED STATES PATENTS
3,625,087 12/1971 Flory et al. ............... 74/518
3,719,106 3/1973 Schroter ................... 74/518
FOREIGN PATENTS OR APPLICATIONS
1,102,308 2/1968 United Kingdom .......... 74/518

*Primary Examiner*—Samuel Scott
*Assistant Examiner*—F. D. Shoemaker
*Attorney, Agent, or Firm*—James B. Raden; Marvin M. Chaban

[57] ABSTRACT

An emergency or parking brake control assembly is disclosed in which a foot-actuated lever carries a brake-operating cable during a single stroke on foot-actuation of the lever. A cam surface is provided on the lever to increase the output travel of the cable for a given input force by deflecting the cable to a multiple plane pattern on movement of the lever toward its fully operated condition. The cable deflection provides an independently controlled ratio in addition to the normal variable ratio output force over the travel of the lever to its fully operated condition. The mechanism is a self-contained one whose only output is movement of the brake-operating cable, the remaining components of the assembly being mounted on a single common mounting bracket.

6 Claims, 5 Drawing Figures

PARKING BRAKE CONTROL ASSEMBLY

DESCRIPTION OF THE PRIOR ART

Parking or emergency brakes are well-known in the art. These brakes are generally actuated responsive to depression of a foot pedal and remain locked following actuation. The brake is generally released from the locked condition by means of a manual release by pulling out a knob or the like.

One of the more generally used types is that having a large, unitary or multiple lever pivotally mounted for rotation about its intermediate portion. One end of the lever protrudes from the pivotal mounting to a position accessible to the foot of the brake user. The other end supports one end of a cable.

Depression of the foot pedal rotates the lever through a comparatively small arc and pulls the cable to actuate the brake mechanism. Ratchet and pawl gearing or a clutch holds the brake in the actuated condition. To release the brake, the knob is pulled to release the meshing of the members to release the brake. For example, see U.S. Pat. No. 3,625,087 issued Dec. 7, 1971 to D. M. Flory et al. In that patent, there is shown a complex assembly with clutch mechanisms, gear wheels and multiple levers and ratchets to complete the emergency braking with variable ratio force multiplication. The force multiplying guide is rotatable about one pivot while the lever itself is rotatable about a second pivot, the pivots being clutched together by an intricate mechanism.

SUMMARY OF THE INVENTION

The present invention provides a unitary emergency brake control using a simple pivot lever. Depression of the foot pedal is resisted by the output cable within its remote mounting. As the force is first applied, the cable is drawn taut, taking up slack in the brake mechanism, and the cable thereafter resists rotation of the lever. This resistance must be overcome to allow the pivot lever to rotate through an arc sufficient to draw the cable a finite distance.

The force applied must be within the range which can be applied by the foot of the user. The pedal travel allowable is limited by space consideration and yet the mechanical advantage must be such as to produce a greatly enhanced output force. Thus, when the output travel of the remote end of the cable is increased for a predetermined angular movement of the pedal lever, the output force generated is also increased accordingly.

As the pivot lever rotates, it carries with it an arcuate toothed sector into mesh with a holding pawl. Release of the holding pawl is responsive to manual movement of a knob pulling a rigid rod to move the pawl out of mesh allowing the pedal to restore under the force of the cable.

In one form, the force ratio-modifying cam is concentric about the central pivot of the pedal at a radial distance from the pivot axis less than the initial radial distance but greater than the radial distance without the cam. In another form, the cam surface is curved eccentrically relative to the pedal pivot to provide a controlled increase in mechanical advantage during rotation about the pedal pivot axis.

It is therefore an object of the invention to provide an improved parking brake pedal control mechanism.

It is a further object of the invention to provide a parking brake pedal control mechanism with a unitary pedal lever which applies its output through a cable, the cable being carried over an integral pedal lever to increase the output travel movement of the output cable directly.

It is a still further object of the invention to provide a parking brake assembly including a unitary pedal lever with the pedal operating, release and ratio changing apparatus all secured on a common mounting bracket.

Other objects, features and advantages of the invention will become apparent from the accompanying description viewed in conjunction with the drawings described briefly thereafter.

DETAILED DESCRIPTION OF THE INVENTION

Figure 1:
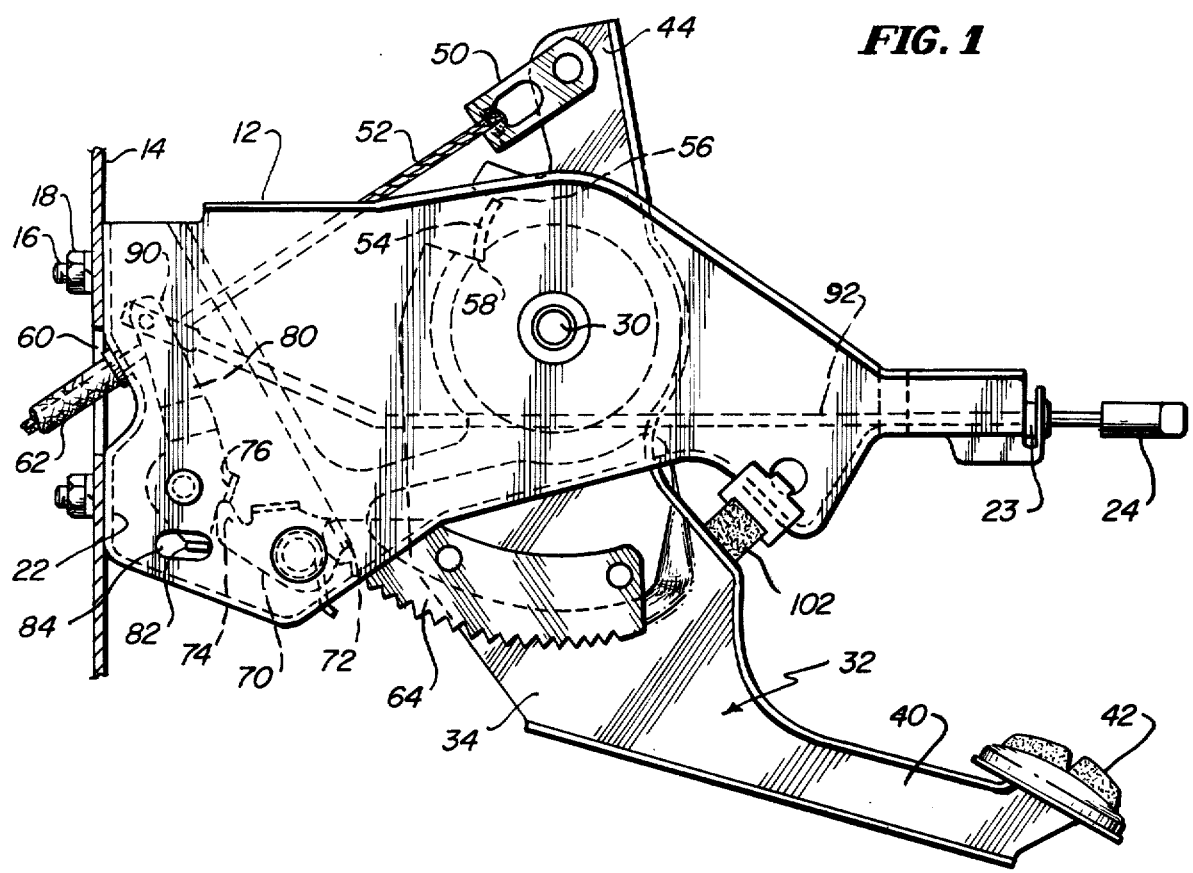
FIG. 1 is a side view in elevation of a first embodiment of my brake control assembly in the released condition.

In FIG. 1, I show one embodiment of may invention in which a stationary mounting bracket 12 is bolted or suitably affixed to the firewall 14 of a vehicle (not shown) by means of bolts 16 and nuts 18. The stationary mounting bracket 12 is rigidly affixed to the wall on the driver's side of the firewall as is well-known in the art. Bracket 12 is essentially planar with the transverse ends formed over for the wall mounting at one end 22 and at the opposite end 23 to receive the manual handle 24 at the free end. To provide structural rigidity and reinforcing, the bracket edges are formed over conventionally.

Intermediately, along its length, the bracket journals a pivot pin 30, the pin 30 supporting the main pedal level 32 for rotation in an essentially vertical plane parallel to the plane of the bracket main section. The lever 32 is pivotal about its intermediate area 34, from which an elongated downwardly and outwardly extending curved leg 40 protrudes. The leg 40 terminates in a recurved section bearing a foot pad 42.

At its opposed end, the main lever has an integral, upwardly, radially extending finger 44. Finger 44 bears a pivotal support for a cable-receiving terminal 50 which may be a clevis or other suitable pivotal terminator for a cable 52. Spaced angularly from the finger 44 about the peripheral edge of the pedal lever is a formed-over cam or abutment 54. This cam presents an outwardly convex arcuate surface which in the embodiment of FIGS. 1 and 2, is eccentric about the pedal pivot axis.

Figure 2:
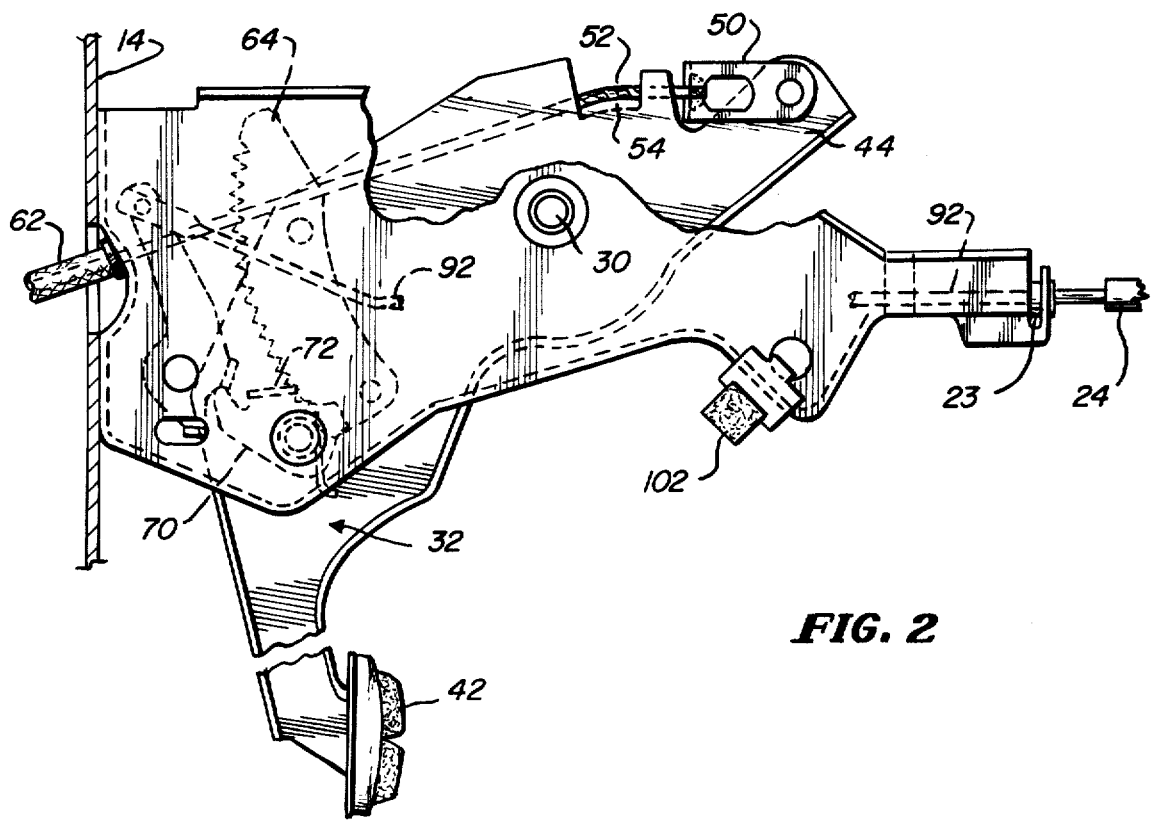
FIG. 2 is a side view in elevation of the assembly of FIG. 1 in the operated condition.

The pedal lever 32 is movable under foot pressure on the pad 42 to rotate the lever in a clockwise direction as viewed in FIGS. 1 and 2. With the eccentric cam 54, the forward end 56 of the cam surface is at a radially greater distance from the pivot axis than the trailing end 58 of the cam.

The cable secured to the cable terminator passes through an opening 60 in the end section of mounting bracket for passage through a flexible tube 62 in a known manner to a connection (not shown) to the brake mechanism.

A latch and release mechanism for the assembly includes an arcuate sector gear 64 concentric about the pedal lever axis secured to the pedal lever for rotation with it. The gear teeth face outwardly to be engaged by a pawl 70, the pawl being pivotally mounted on the bracket. The pawl has a single tooth 72 extending into the travel path of the teeth and may be spring-loaded by a suitable torsion spring to allow the pedal to be operated and to hold the pedal when depressed. A finger 74 on the pawl is in contact with a lug 76 on a release lever 80, the release lever being pivotally secured to the mounting bracket. The travel path of the release lever 80 is restricted by a projection 82 on the lever which rides within a mounting bracket slot 84 of limited extent. The remote end 90 of the release lever holds one end of a rigid release rod 92, the other end of the rod extending through the mounting free end to terminate in a manually graspable handle or knob 24.

A resilient stop 102 on the mounting bracket abuts a section wall of the pedal lever 32 to provide a normal travel stop for the pedal lever.

In the normal condition of FIG. 1 with the pedal lever 32 resting against the stop 102, the brake-operating cable 52 extends from the pedal finger 44 to the wall opening 60 above the pedal cam 54.

On depression of the foot pedal, the pedal lever rotates and the sector gear 64 engages the pawl tooth 72 to hold the pedal in the operated condition. The cable 52 resists the movement and begins to take up slack in the brake mechanism at the start of the pedal travel. As the pedal continues its movement, the cable is drawn across the arcuate cam 54 to the fully operated condition of FIG. 2. In this condition, the cable 52 is deflected from its straight taut condition to a bowed condition causing greater travel of the cable output end than would occur with a straight, undeflected cable.

When it is desired to release the cable, manual release knob 24 is grasped and pulled in a direction away from the assembly. This pull movement draws the rod 92 out to pivot the release lever 80 clockwise (FIGS. 1 and 2). Pivoting of the release lever cocks the release pawl to release its mesh engagement with the segment teeth and allow the pedal to restore under the cable tension.

Figure 3:
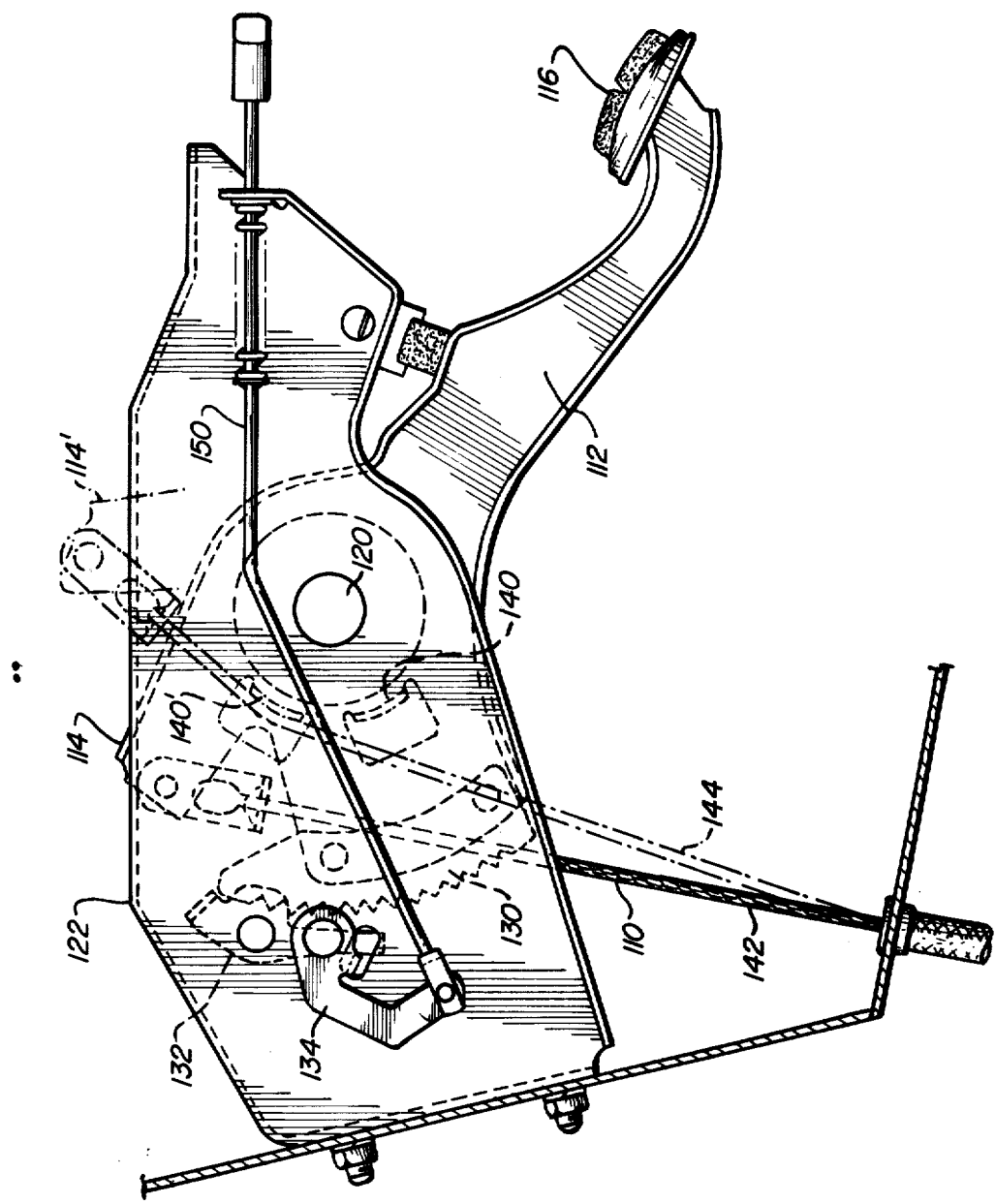
FIG. 3 is a side view in elevation of a second embodiment of my invention.

In FIG. 3, I show a second embodiment of the invention. In this embodiment, the components of the assembly are similar to those of FIGS. 1 and 2 although the configuration and relative positioning of the components is somewhat different. The brake-operating cable 110 is essentially in a vertical plane with the pedal lever 112 in its normal condition. The cable is affixed to one end 114 of the pedal lever at the end remote from a foot pad portion 116 and essentially diametrically opposed to it across the pivot 120 of the pedal lever on the mounting bracket 122. The holding gear segment 130 is secured to the pedal lever adjacent the side periphery of the lever with the pawl 132 and release lever 134 secured to the mounting bracket in a position to engage the gear segment and lock the pedal relative to the bracket.

A formed-over cam surface 140 on the pedal lever concentric to the pivotal axis 120 of the lever is provided, this surface being positioned in the path of the cable as the pedal lever is depressed. Again, the cable 110 is deflected from a linear path 142 to an angled or multiple plane path 144 as shown by the dashed lines. The pedal lever end 114 is moved to the position indicated as 114' and the cam 140 is moved to the position indicated as 140'.

Release of the embodiment of FIG. 3 is generally similar to that shown previously in that pulling of release rod 150 pivots the release lever 134 to retract the pawl 132 from the gear segment and allow the pedal lever to restore.

Figure 4:
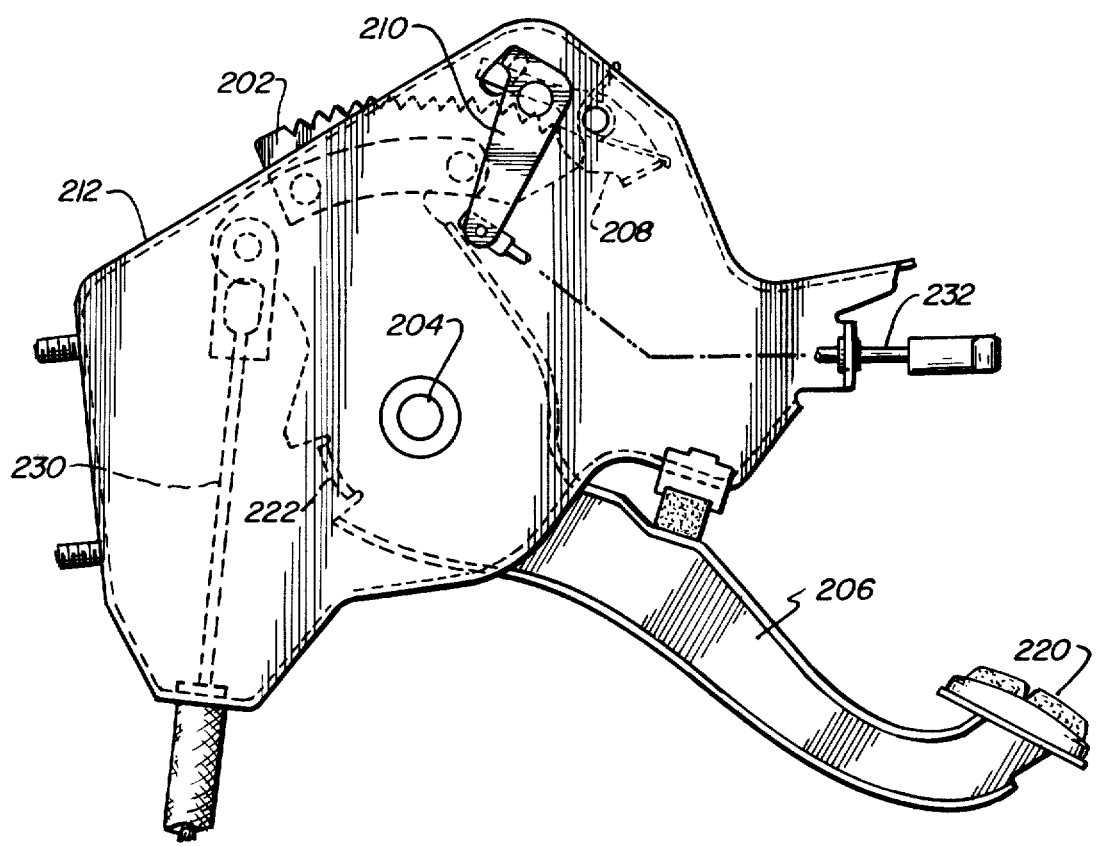
FIG. 4 is a side elevational view of a third embodiment of my invention.

The embodiment of FIG. 4 employs a slightly different configuration and relative positioning of components when viewed against the embodiment of FIG. 3. In FIG. 4, the holding gear segment 202 is again affixed to the pedal lever and in the normal position is above the pivot axis 204 of the pedal lever 206 adjacent to the holding pawl 208. The pawl 208 and release lever 210 are secured on the mounting bracket 212 so that engagement of the pawl and gear segment locks the pedal lever relative to the mounting bracket. The cable-terminating finger in the normal condition is almost directly opposite the foot pad section 220 of the lever. A concentric formed-over cam surface 222 is provided on the pedal lever periphery. The cam surface rotates with the pedal lever about the lever axis and acts to deflect the cable 230 to a position as described relative to FIGS. 2 and 3.

Release of the holding action is similar to that previously described in that pulling of the release rod 232 rotates the release lever 210 to pull pawl 208 out of mesh with the gear segment and to allow the pedal lever to restore.

In the assembly shown in FIGS. 1 and 2, the cable terminator is rotated clockwise on rotation of the pedal lever. The radial distance of cable from the pedal axis is continuously decreased to a minimum valve which would occur if the cable were to remain fully taut and straight. A ratio of about 10 to 1 in the radial distance could be produced in this manner by action following curve A of FIG. 5.

Figure 5:
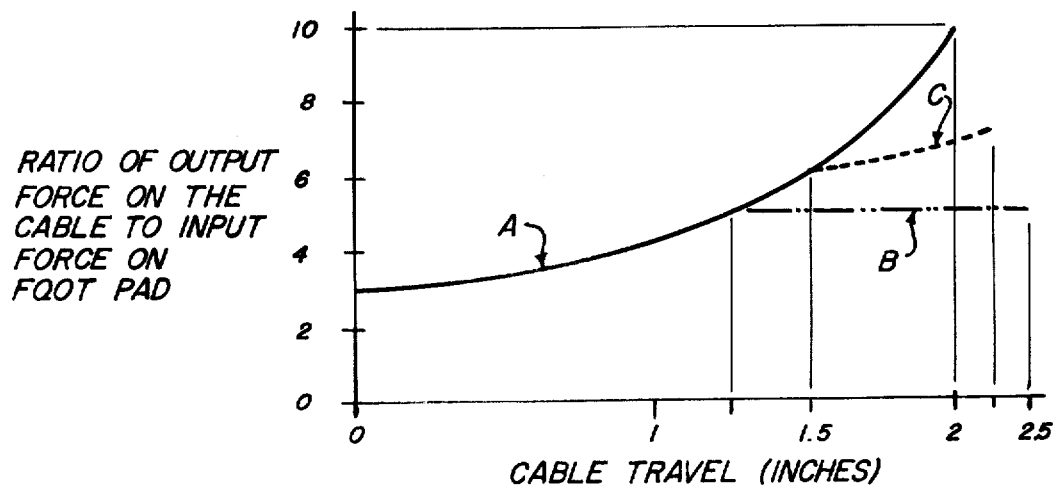
FIG. 5 is a force-ratio chart showing the relationships of these parameters for certain embodiments of the invention.

It is more desirable to limit the ratio at a value sufficient to operate the brake mechanism fully. This limit may be imposed by limiting the driven radial distance and at the same time increasing the cable travel. This function is accomplished by providing a cam surface to limit the driven radial distance and to elongate the cable by deflecting it from a straight pattern. With a concentric cam surface, the curve of B in FIG. 5 is followed with the ratio approximately level once the cam has taken effect. The embodiment of FIGS. 3 and 4 use this type of cam.

The curve designated C occurs when an eccentric cam having an output radious which decreases but less sharply than with the curve A. A cam as shown in FIGS. 1 and 2 provides a curve such as curve C.

In the embodiments shown, the lever arm distance from the pivot axis to the foot pad may be on the order of nine inches while the lever distance from the pivot axis to the cable mounting is on the order of 3 inches. Thus, a mechanical advantage of approximately three to one is produced. An input force of approximately 100 pounds is the practical maximum allowable input necessary to operate the emergency brake. This input force must produce an output of greater than six hundred pounds to fully operate the brake mechanism of the vehicle.

At the start of operation of the movement of the pedal, a ratio of about three is developed by the lever ratios. As the slack in the cable is reduced, the output forces begins to increase responsive to the foot pressure. As the cable continues to be pulled taut by rotation of the pedal, the cable is drawn closer to the pivot axis of the pedal increasing the mechanical advantage and output ratio. The output radial distance decreases until the cam surface is engaged by the cable. The radial distance is thus limited dependent on the configuration of the cam surface and its radial distance from the pedal pivot. The cam deflects the cable and causes the cable output travel to increase above that of a taut and straight cable, causing a more effective braking action.

I claim:

1. A parking brake control mechanism for a vehicle, comprising a pedal-actuated lever responsive to a depressive force applied to an input end thereof for rotation about a central pivot axis, a flexible cable with one end thereof secured to an output end of said lever and the remote end of said cable connected to a brake mechanism, the position of securement of said cable to said lever rendering said cable taut at increasingly lessened radial distances from the pivot axis of said lever during rotation thereof to produce a pull force on said cable, an abutment commonly mounted on said lever for rotation about the lever pivot axis at a predetermined radial distance from the lever pivot axis at a predetermined radial distance from the lever pivot axis, said abutment rotative on rotation of the lever to deflect and raise said cable intermediately between the ends thereof on rotation of said lever to increase the distance of travel of the remote end of the cable caused by said lever rotation.

2. A brake control mechanism as claimed in claim 1, wherein said abutment comprises a surface concentric to the axis of said pedal-actuated lever.

3. A brake control mechanism as claimed in claim 1, wherein said abutment comprises a surface eccentric to said lever axis with the forward end of said surface in the direction of rotation is at a greater radial distance from the axis of the lever than the trailing end of said surface.

4. A brake control mechanism as claimed in claim 1 wherein there is a gear segment affixed to said pedal lever for rotation therewith, a fixed member, a pawl secured to said fixed member, said pawl biased to pivot in a first direction and hold said gear segment on rotation of said pedal lever and prevent relative movement between said pedal lever and said fixed member, and a release lever secured to said fixed member and pivotal to engage and drive said pawl in a direction opposite said first direction to release the hold of said pawl and said gear segment to allow relative movement between said pedal lever and fixed member.

5. A parking brake control mechanism for vehicle comprising a unitary pedal lever having an input end, a central pivot axis and an output end, the radial distances of said input end and said output end relative to said pivot axis productive of a mechanical advantage on rotation of said lever, a flexible cable with one end thereof secured to the output end of said lever and the other end of said cable connected to a braking apparatus, means securing said cable to said lever at a position rendering said cable taut with radial distances successively less than an initial radial distance from the pivot axis of said lever during rotation of the pedal lever, a camming member commonly mounted on said lever for rotation about the lever pivot axis at a radial distance from the lever axis less than said initial radial distance, said abutment rotative with the lever to deflect and raise said cable intermediately between the ends thereof on rotation of said lever to increase the distance of travel of the remote end of the cable caused by said lever rotation.

6. A brake control mechanism as claimed in claim 5, wherein said input end of said pedal lever includes a footoperated pad on the lever end and said output end comprises a cable terminating member.

* * * * *